US009735621B2

(12) United States Patent
McCarthy et al.

(10) Patent No.: US 9,735,621 B2
(45) Date of Patent: Aug. 15, 2017

(54) SEGMENT PROTECTED PARALLEL BUS

(71) Applicant: Equinix, Inc., Redwood City, CA (US)

(72) Inventors: Chad McCarthy, Frankfurt am Main (DE); Ralph Voss, Laucha (DE)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 15/295,467

(22) Filed: Oct. 17, 2016

(65) Prior Publication Data

US 2017/0033599 A1   Feb. 2, 2017

Related U.S. Application Data

(63) Continuation of application No. 14/087,720, filed on Nov. 22, 2013, now Pat. No. 9,472,981.

(60) Provisional application No. 61/823,136, filed on May 14, 2013.

(51) Int. Cl.
*H02J 7/00* (2006.01)
*H02J 9/00* (2006.01)
*H02J 9/06* (2006.01)
*H02J 9/08* (2006.01)

(52) U.S. Cl.
CPC ............... *H02J 9/066* (2013.01); *H02J 9/08* (2013.01); *Y10T 307/636* (2015.04)

(58) Field of Classification Search
CPC ......... H02J 9/00; H02J 9/066; Y10T 307/615; Y10T 307/636
USPC ..................................................... 307/64, 68
See application file for complete search history.

(56) References Cited

U.S. PATENT DOCUMENTS

| | | |
|---|---|---|
| 6,191,500 B1 | 2/2001 | Toy |
| 7,825,541 B2 | 11/2010 | Herbener et al. |
| 9,472,981 B2 | 10/2016 | McCarthy et al. |
| 2008/0034256 A1 | 2/2008 | Mosman |
| 2008/0103630 A1* | 5/2008 | Eckroad .......... H02J 3/02 700/286 |

FOREIGN PATENT DOCUMENTS

| | | |
|---|---|---|
| DE | 102007021089 B3 | 12/2008 |
| DE | 102011089851 A1 | 6/2012 |
| WO | 9809359 A1 | 3/2008 |

OTHER PUBLICATIONS

Prosecution History from U.S. Appl. No. 14/087,720, dated Mar. 21, 2016 through Jun. 21, 2016, 29 pp.

* cited by examiner

*Primary Examiner* — Carlos Amaya
(74) *Attorney, Agent, or Firm* — Shumaker & Sieffert, P.A.

(57) ABSTRACT

A Segment Protected Parallel Bus is for an uninterruptible power supply to electric consumers, whereby at least two electrical distributed power generation units, are connected electrically parallel, each distributed power generation unit is coupled to at least one electric consumer bus. At least two electrical protection zones for isolating electrical faults and multiple protection zones with instantaneous tripping for the electrical parallel connection of consumer networks are provided in a mutual electrical ring connection. In the ring connection, a first switching element with a switching time of less than 10 ms for the electrical decoupling of the consumer buses from one another starting at a predetermined voltage drop, which is established according to load requirements, is arranged between each protection zone with instantaneous tripping and an adjacent protection zone in the first ring direction with instantaneous tripping and an adjacent protection zone in the second ring direction with instantaneous tripping.

8 Claims, 10 Drawing Sheets

SEGMENT PROTECTED PARALLEL BUS

This application is a continuation of U.S. application Ser. No. 14/087,720 filed Nov. 22, 2013 which claims priority to U.S. Provisional Application No. 61/823,136, filed May 14, 2013, each of which are incorporated herein by reference in their respective entireties.

TECHNICAL FIELD

The present invention relates to a device for an uninterruptible power supply to electric consumers, whereby at least two distributed electrical power generating units, independent from one another, are connected electrically parallel, whereby each distributed power generating unit is coupled to at least one electric consumer bus, comprising at least one electric consumer connection. The invention relates further to a method for operating the device.

BACKGROUND

It is generally known from the conventional art that in disturbances in the power grid an electrical supply to high-availability electric consumers is assured by means of a so-called uninterruptible power supply, abbreviated UPS. The uninterruptible power supply is realized in that in a failure of the power grid or network supply the electric consumers continue to be supplied by means of uninterruptible power supply devices without interruption.

According to the conventional art, the uninterruptible power supply to high-availability consumers with uninterruptible power supply devices is assured, which are distinguished by different redundancies.

For the uninterruptible power supply devices the backup power supply thus occurs by means of so-called electrical distributed power generating units.

The high-availability consumers comprise critical consumers who should be supplied without interruption and essential consumers who can continue to be supplied with short term interruptions of up to ca. 15 seconds. An uninterruptible supply for critical customers in the present case is also understood to supply power with short interruptions of much less than 20 ms.

Critical consumers are supplied by uninterruptible power supply units, called UPS units hereafter, of a different type, i.e., statically or dynamically. Said UPS units and essential consumers, which continue to be supplied with interruption, in the case of failure of the power grid or the network supply are supplied with electrical power by internal combustion reciprocating piston engines or other distributed power generating units.

To increase the overall availability, the distributed power generating units usually have a redundant structure. For economic reasons, the redundant structure is generally realized with an N+1 redundancy.

On this basis, there are isolated parallel-connected supply devices with parallel-connected diesel-dynamic uninterruptible power supply units. In the diesel-dynamic units, the uninterruptible power supply to the critical consumers occurs via a synchronous generator, which is decoupled by an electrical, inductive impedance between the electrical network and the electric consumer.

The synchronous generator is powered by a synchronous motor during network operation. It is assured by an energy storage device that during an interruption of the network, the system generates power and continues to supply the critical consumers until the start of the coupled diesel engine. After the diesel engine is started, it takes over powering the synchronous generator, which continues to supply the load without interruption.

U.S. 2008/0034256 A1 discloses an isolated-parallel device for uninterruptible power supply. The device comprises two diesel-operated UPS units, both of which work with a low voltage, medium voltage, or a combination of low and medium voltage. For the electrical supply to critical and essential consumers, the UPS units are provided with electrical power from a power grid. In this regard, the UPS units are designed for operation as independent systems, whereby each UPS unit comprises a choke coil for conditioning the electrical power obtained from the power grid for use for the critical consumers and a diesel engine, which is provided for the long-term backup supply of electrical power to the critical and essential consumers during interruption of the power grid supply. Furthermore, the UPS units in each case comprise a power storage device, which is coupled to the diesel engine generator unit and provides for short-term backup power supply to the critical consumers during the diesel engine start period. Furthermore, a system switch panel is provided for each UPS unit; said switching unit controls the electrical supply to the important and critical electrical loads during a change from grid power to the UPS unit. Furthermore, an output bus is provided for each UPS unit, the said bus controls the electrical connection of the choke coil and the diesel engine generator unit to the important and critical electrical loads and the transmission of electrical power from and to the power grid, from and to the diesel engine generator unit, and from and to the choke coil. Further, an adjustable choke coil, coupled to the output bus of a UPS unit, is provided, which allows energy flow from one output bus to another output bus and limits the fault current between the UPS units and thus isolates each UPS unit from the electrical faults of the other UPS units.

Furthermore, WO 98/09359 A1 discloses a device and a method for supplying electrical loads. The device comprises an electrically conductive distribution bus, which is coupled to two electrical power sources and the electrical loads. At least three fast acting fault current limiters are coupled to the distribution bus via which the generators and the electrical loads are connected. This ensures that faults occurring at generators or load connections are interrupted quickly enough to avoid compromising the common bus voltage and other connected consumers.

DE 10 2007 021 089 B3, which corresponds to U.S. Pat. No. 7,825,541, and which describes a device with multiple parallel-connected backup power sources, whereby the backup power sources are each connected in a detachable fashion on the input side to an AC grid via a choke coil and on the output side to a common load bus. The power, output by each individual backup power source, is adjustable. Further, a controller is provided, which when a failure in the AC grid occurs, disconnects the backup power sources affected by the failure from the AC grid. Further, the controller is provided to reconnect the backup power sources one after the other to the AC grid after the return of the AC grid and to coordinate the power output by the individual backup power sources. The controller has a device for determining a phase angle between the AC grid and the load bus. Further, to coordinate the power output by the individual backup power sources, while one part of the backup power sources is connected to the AC grid on the input side and another part of the backup power sources is not connected to the AC grid on the input side, the controller adjusts the power output by each of the backup power sources not yet reconnected to the AC grid as a function of the phase angle. Further, a method for controlling multiple parallel-connected backup power sources is described.

SUMMARY

It is therefore an object of the present invention to provide an improved device for an uninterruptible power supply to electric consumers and an improved method for operating the device.

In the case of the device for the uninterruptible power supply to electric consumers, at least two independent electrical distributed power generation units are connected electrically parallel, whereby each distributed power generation unit is coupled to at least one electric consumer bus, comprising at least one electric consumer connection.

According to an embodiment of the invention, at least two electrical protection zones for isolating electrical faults and multiple protection zones with instantaneous tripping for the electrical parallel connection of consumer networks, each comprising at least one consumer bus, are provided in a common electrical ring connection. In this case, the protection zones with the instantaneous tripping each include at least one consumer bus, an associated bypass branch to directly link the consumer bus to the ring connection and a coil branch for coupling to an adjacent consumer bus in a second ring direction. Arranged in the ring connection, between each protection zone with instantaneous tripping and a protection zone, adjacent in a first ring direction, with instantaneous tripping and a protection zone, adjacent in a second ring direction, with instantaneous tripping is in each case a first switching element with a switching time of less than 10 ms for the electrical decoupling of the consumer buses from one another starting at a predetermined voltage drop (U%), which is established according to load requirements, but not higher than 30% in the consumer buses or a total fault current starting at about 600% in the ring connection, based on a nominal full load current.

The first switching element of the protection zone with instantaneous tripping within 10 ms is in particular a switching device that has two parallel current paths. A main current path is provided for the operating current of, for example, up to 5000 A. According to an embodiment of the switching device, triggered in particular by means of analog differential current monitoring, in the case of an electrical fault a fuse element, connected parallel to the main current path, limits the short circuit current in the first current rise in less than 1 ms. The total switching time including the fault detection is less than 10 ms.

It is achieved by means of the device of the invention that the consumer buses each have a redundant electrical feed. The redundant feed occurs, on the one hand, from the distributed power generation unit coupled to the particular consumer bus and, on the other, with the distributed power generation units of the rest of the consumer buses via the ring connection. The electrical power of each distributed power generation unit is designed in such a way that a so-called N+1 power redundancy is present in the device, i.e., in the total system. This is taken to mean that the electrical power of all electric consumers in the total system in the case of a failure or absence of a distributed power generation unit is supplied by means of a remaining distributed power generation unit or multiple remaining distributed power generation units.

Furthermore, the device of the invention enables in an especially advantageous manner in electrically parallel-connected consumer buses and parallel-connected distributed power generation units a permanent redundant and uninterruptible power supply for electric consumers arranged at the consumer buses. In this case, because of the different protection zones and the very rapid decoupling of the consumer buses in the case of an electrical fault by means of the first switching elements, the device makes it possible that also in arising electrical faults the necessary electric consumer voltage is assured in the total system. In other words, a permanent redundant uninterruptible power supply is assured.

In an embodiment, the device is designed in such a way that power switches and switching elements with a switching time of less than 10 ms, present in the protection zones, can be controlled as a function of fault location and also as a function of fault strength. Fault strength is understood here in particular as a value of a fault current or short-circuit current. Thus, disconnecting a zone affected by an electrical fault can occur at different disconnection times as a function of fault location and fault strength based on the power switches and switching elements. A Power Switch is herewith defined to be any device with a manual and an automatic protective operation for isolation of faults and includes for example circuit breakers.

A segment-by-segment decoupling of the consumer buses from one another is assured because of the division of the protection concept into protection zones with instantaneous tripping and disconnection times, which depending on the fault location and fault strength activate different power switches and switching elements, i.e., different types of disconnection. Thus, an electrical fault in a protection zone or protection zone with instantaneous tripping will not have a negative effect on the consumer buses and on the electrical supply of the critical consumers and a segment-protected parallel bus (abbreviated as SPP bus) is created.

In an advantageous embodiment, the bus protection zones with instantaneous tripping in each case include in the first ring direction a bypass branch of a consumer bus and in each case at least partially a coil branch, connected electrically parallel to it, of an adjacent consumer bus in the second ring direction, whereby in each case one consumer bus is connected via a short-circuit limiting coil, arranged in the coil branch, to the ring connection and electrically parallel to at least one other consumer bus. Because of the designed impedance of the short-circuit current limiting coil and the very short switching time of the power switches of the protection zones of preferably less than 40 ms in an electrical short circuit in one of the consumer buses, it is assured that the electrical voltage in the other consumer buses remains within necessary tolerances.

Compared with solutions known from the conventional art, it is possible to eliminate the problem of weak points in parallel-connected systems of this type, which form the electrical connection between the systems. Because of the execution of the short-circuit current limiting coils combined with the protection zones of the invention, it is possible in the case of sufficiently high impedance values in the short-circuit current limiting coil to assure that voltage quality at the consumer buses not affected by the electrical fault remains within a range acceptable to the consumers. According to the conventional art, it is not possible, however, in electrical short circuits with very high short-circuit currents at the actual electrical connection between the consumer networks to provide the necessary impedance in a stable manner. The reason for this is that the supply voltage changes negatively during normal operation of the consumer bus as a function of the inductance of the short-circuit current limiting coil and as a function of the power factor or active factor "cos $\phi$" of the electric consumers.

Based on the segment-by-segment decoupling by means of the first switching element with the switching time of less than 10 ms, however, the device makes it possible that the consumer voltage is kept within an acceptable range during these short circuits with high short-circuit currents within a protection zone with instantaneous tripping. For higher impedance faults, which have less of an effect on consumer voltage, preferably the power switches of the protection zones are triggered within less than 40 ms. It is assured in this way that the consumer voltage in unaffected consumer buses is kept within a tolerance acceptable for the electric consumers, particularly according to the EN 50160, VDE 0150, or the IT industry-specific ITIC (CBEMA) curve. In addition, the protection zones arranged as described in this invention ensure that consumer buses not affected by an electrical fault will not be isolated. Thus, the electrical power supply to the consumer buses is nevertheless assured in the case of an electrical fault directly in the ring connection between the consumer buses and a resulting isolation of the fault within a protection zone with instantaneous tripping.

Because of the segment-by-segment isolation of the consumer branches, it is possible, furthermore, compared with cost-intensive devices with N+N redundancies from the conventional art that maintenance on the distributed power generation units can be performed without the uninterruptible power supply to the consumer buses being interrupted.

According to an embodiment of the invention, in the coil branch of the short-circuit current limiting coil, a first power switch is arranged upstream of said coil. Downstream of the short-circuit current limiting coil, a coil connection node of the coil branch is electrically coupled to the ring connection in the first ring direction with a second power switch and in the second ring direction with a third power switch, whereby the bypass branch, connected electrically parallel to the particular short-circuit current limiting coil, is coupled to the consumer bus with a fourth power switch for bypassing the particular short-circuit current limiting coil and to the mutual electrical ring connection via a bypass node. The fourth power switch is provided to bypass the coil branch so that the voltage drop, occurring as a function of the power factor or active factor "cos $\varphi$" of the electric consumers, in the supply voltage in the consumer bus is prevented when the power is taken over by the redundant supply route via the short-circuit current limiting coil in the coil branch. This fourth power switch is integrated into a control of the protection zones, so that the connection of the fourth power switch does not occur in a protection zone with instantaneous tripping affected by an electrical fault.

One each of the first switching elements is arranged between the bypass node and the third power switch. This embodiment of the device of the invention enables, on the one hand, that a voltage dip in consumer buses, not affected by the fault, in the case of fault in one of the protection zones with instantaneous tripping within the time of less than 10 ms does not lead to a negative voltage dip for the consumer. On the other hand, an especially simple realization of the protection concept is possible at low cost.

In an embodiment of the invention, the protection zones comprise a first protection zone, which in each case is comprised of an distributed power generation unit and a second switching element with a switching time of less than 10 ms for the electrical decoupling of the particular distributed power generation unit from the associated consumer buses. Thus, also the distributed power generation unit in an electrical fault in the protection zone with instantaneous tripping or in the distributed power generation unit itself can be decoupled from the consumer buses, so that the electrical fault does not have a negative effect on the unaffected consumer buses and distributed power generation units.

The second switching element is thereby designed in the same manner as the first switching element.

In an embodiment of the device of the invention, the protection zones have a second protection zone, which is formed as a line differential protection zone between the first power switch, the second power switch, and the third power switch. The line differential zone switches here have particularly a switching time of less than 40 ms during the occurrence of electrical faults in the line differential protection zone. It is therefore assured, that a voltage dip in the consumer buses not affected by the electrical fault, in the event of a fault in the second protection zone within the time of less than 40 ms does not lead to a voltage dip which is negative for the consumers.

The protection zones furthermore include a third protection zone, which is designed as a line differential protection zone between the fourth power switch, the third power switch, and the second power switch of an adjacent consumer network in the second ring direction. Here as well, the power switches have in particular a switching time of less than 40 ms when an electrical fault occurs in the line differential protection zone. It is therefore possible that a voltage dip in the consumer buses, not affected by the electrical fault, does not lead to a negative voltage dip for the consumer when a fault occurs in the third protection zone within the time of less than 40 ms.

Furthermore, in order to realize the protection zones and the decoupling of the protection zones with instantaneous tripping independently of one another, the power switches and second switching elements present in the protection zones can be controlled independently of one another and independently of the first switching elements.

According to an advantageous development of the invention, the parallel connection of the consumer buses is made in a star formation around the ring connection. This enables a simple structure of the device and a simple electrical interconnection and control of all components in the consumer networks.

A redundant communication link for information exchange is formed between the distributed power generation units, so that status information of the distributed power generation units as well as load balancing can be communicated to all distributed power generation units. It is furthermore possible that a fault message be provided in event of an interruption of a communications link. It is also enables, in event of a communication failure of a consumer branch, that the associated distributed power generation unit be isolated from the parallel-connected connection by opening of the first power switch and blocking of the fourth power switch in the open condition. Thereby, the normal function of the remaining consumer buses in the parallel connection is assured and the distributed power generation unit with the failure continues to supply the associated consumer bus as an island with loss of the redundancy via the parallel bus connection. The invention requires this structure of embodiment to ensure that also under this operating condition the consumer voltage in the consumer buses remains within the tolerable range for the electric consumer.

In an embodiment of the invention, the distributed power generation units can be diesel-dynamic UPS units, which are coupled to a common electrical supply network.

In this case, the distributed power generation units are arranged between the supply network and the particular consumer bus and decoupled from the supply network by means of a first inductive impedance and a second inductive impedance. Thus, disturbances in the upstream supply network cannot be transmitted to the consumer buses and vice versa.

The distributed power generation units are designed, for example, as units for an uninterruptible power supply and include in each case a synchronous generator, which is arranged between the common supply network and the particular consumer bus and is decoupled from the upstream supply network by means of the first inductive impedance and from the particular consumer bus by means of the second inductive impedance.

The synchronous generator is coupled to a synchronous motor and can be driven by means of it as is necessary during grid operation of the electric consumer.

In an embodiment, the synchronous generator is coupled to an internal combustion engine and can be driven by it during an interruption of the grid operation.

In order to assure the uninterruptible power supply to the consumer during the time period between the interruption of the grid operation to the start of the coupled internal combustion engine, the synchronous generator during this time period is coupled to an energy storage device and can be driven by means of the electrical power from the energy storage device.

In another embodiment, there is no supply network upstream of the distributed power generation units. In this embodiment, in the parallel connected distributed power generation units do not have the first and second decoupling impedances and the realization of the distributed power generation unit is with a unit comprising an internal combustion engine and synchronous generator.

In another embodiment of the device, electric consumers, which have two independent feeds, are arranged at the consumer buses. In this regard, a first, so-called A-supply for these consumers is taken over by the assigned distributed power generation unit and/or the assigned supply network. A second, so-called B-supply is taken over from a parallel-connected distributed power generation unit and/or the supply network. The division of all electric consumers occurs in such a way that there is a uniform load distribution to all consumer buses and their assigned electrical networks.

In the method for operating the device of the invention, according to an embodiment of the invention at least two electrically parallel-connected consumer buses, which are each coupled to an electrical distributed power generation unit and each have at least one electric consumer, are supplied without interruption with electrical power by means of a distributed power generation unit associated with a different consumer bus, in the case of an interruption of the electrical connection to the associated distributed power generation unit. In an electrical fault in an electrical coil branch of a short-circuit current limiting coil, via which the consumer buses are each connected to a mutual electrical ring connection and electrically parallel to one another, the affected coil branch is decoupled from the associated consumer bus and the ring connection by means of a first, second, and third power switch, arranged in a second protection zone. According to the invention, in an electrical fault in a bypass branch, connected electrically parallel to the coil branch, the bypass branch is decoupled from the associated consumer bus and the ring connection by means of a fourth power switch arranged in a third protection zone, a third power switch, and a second power switch of an adjacent consumer network arranged in the second ring direction. When at least one of the electrical faults occurs, depending on a value of a fault current within the ring connection, the consumer buses are electrically decoupled from the coil branch and/or from the bridging branch, in which the electrical fault occurs, by means of two switching elements, arranged in the ring connection, with a switching time of less than 10 ms, starting at a predetermined voltage drop (U%), which is established according to load requirements, but not higher than 30% in the consumer buses or a total fault current at about 600% of nominal full load currentin the ring connection, based on a nominal current.

The method of the invention for operating the device of the invention and embodiments thereof assure that particularly at very high currents of circa 600% of the nominal current within a maximum of 10 ms, the protection zone, affected by the electrical fault, with instantaneous tripping is isolated from the parallel-connected consumer networks. With lower fault currents of, for example, up to 200% of the nominal current, the fault location is isolated preferably within no more than 40 ms, without the consumer voltage in consumer buses not affected by the fault being negatively influenced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
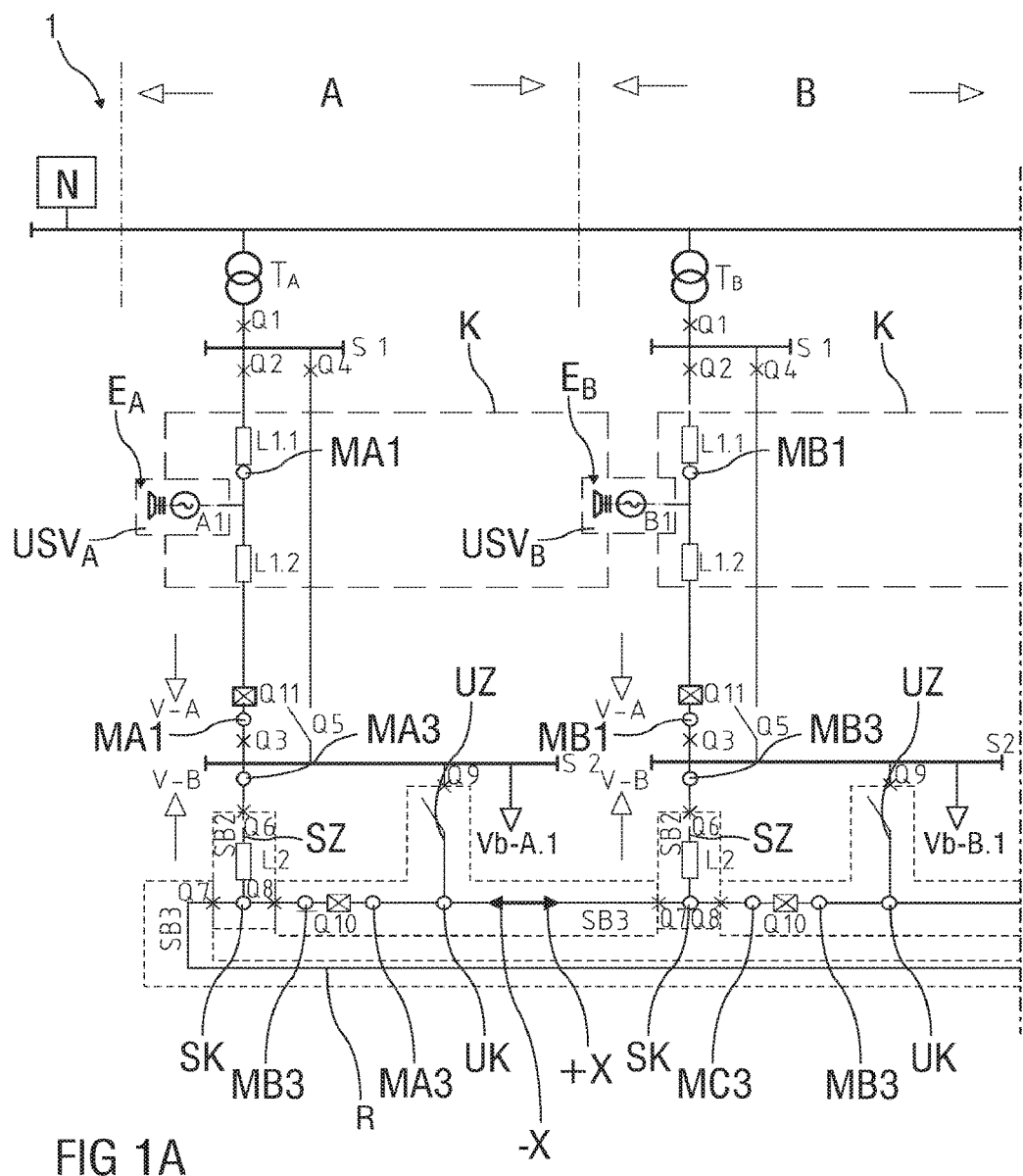
FIGS. 1A and 1B schematically show an electrical circuit diagram of an exemplary embodiment of the device of the invention with four electric consumer buses and four distributed power generation units, which are coupled to an electrical supply network.

Parts corresponding to one another are provided with the same reference characters in all figures.

An electrical circuit diagrams of a first exemplary embodiment of device 1 of the invention for the uninterruptible power supply with four electrically parallel-connected electrical distributed power generation units $E_A$, $E_B$, $E_C$, $E_X$ in electric consumer networks A, B, C, X are shown in FIGS. 1A and 1B and 2A and 2B.

The parallel connection is made star-shaped in a ring structure. Each consumer network A, B, C, X has a protection zone $SB_A$, $SB_B$, $SB_C$, $SB_X$ with instantaneous tripping, also designated as a fourth protection zone $SB_A$, $SB_B$, $SB_C$, $SB_X$ below.

Moreover, each consumer network A, B, C, X includes a consumer bus S2, which is supplied electrically, on the one hand, by the associated distributed power generation unit $E_A$, $E_B$, $E_C$, $E_X$ and, on the other, via a short-circuit current limiting coil L2 by distributed power generation unit $E_A$, $E_B$, $E_C$, $E_X$ of the adjacent consumer networks A, B, C, X.

The depicted device 1 is used particularly in the electrical supplying of so-called high-availability electric consumers in industrial or commercially used low-voltage systems up to 1 kV and medium-voltage systems up to 36 kV. Device 1 has relevant applications particularly in emergency power systems, in systems for distributed generation of electrical power, in combined heat and power systems, or in systems for uninterruptible power supply, which have synchronous machines for generating electrical power and can be operated electrically parallel via impedances.

In the illustrated exemplary embodiment, the distributed power generation units $E_A$, $E_B$, $E_C$, $E_X$ are the units $USV_A$, $USV_B$, $USV_C$, $USV_X$ for the uninterruptible power supply, designated as UPS unit $USV_A$, $USV_B$, $USV_C$, $USV_X$ below, which include synchronous machines for generating electrical power.

In exemplary embodiments not illustrated in greater detail, the distributed power generation units $E_A$, $E_B$, $E_C$, $E_X$ can also be designed in any other manner, for example, as combined heat and power generation units.

In exemplary embodiments also not illustrated, device 1 has a different number of parallel-connected consumer networks A, B, C, X, but at least two such networks. The number of consumer networks A, B, C, X depends on the short-circuit strength of equipment arranged in consumer networks A, B, C, X, respectively.

Each consumer network A, B, C, X has a transformer $T_A$, $T_B$, $T_C$, $T_X$, coupled to an electrical supply network N, for transforming the line voltage into an operating voltage. Supply network N is preferably a low-voltage or a medium-voltage grid.

Transformers $T_A$, $T_B$, $T_C$, $T_X$ are each coupled by means of a power switch Q1 to a distribution bus S1. An electrical path branches at distribution bus S1, whereby a UPS unit $USV_A$, $USV_B$, $USV_C$, $USV_X$ is arranged in a first branch.

UPS units $USV_A$, $USV_B$, $USV_C$, $USV_X$ each have a synchronous generator with a synchronous motor (not shown) with an energy storage device. During grid operation the synchronous generator is coupled to the synchronous motor and is driven by it. When grid operation is interrupted, a synchronous generator is coupled to an internal combustion engine, particularly a diesel- or gas-operated internal combustion reciprocating piston engine, and driven by it.

To assure an uninterruptible power supply, in the time period between the interruption of the grid operation until the start of the coupled internal combustion engine, the synchronous generator is coupled to an energy storage device and driven by means of the electrical power from the energy storage device.

Distributed power generation units $E_A$, $E_B$, $E_C$, $E_X$, i.e., the UPS units $USV_A$, $USV_B$, $USV_C$, $USV_X$, are connected together by means of a redundant communication link K for information exchange between UPS units $USV_A$, $USV_B$, $USV_C$, $USV_X$. Information on a current state of UPS units $USV_A$, $USV_B$, $USV_C$, $USV_X$ and on load balancing is transmitted to all UPS units $USV_A$, $USV_B$, $USV_C$, $USV_X$ via communication link K. Furthermore, a fault message is provided when a communication link K is interrupted. The redundant structure of the communication link K assures that during communication interruptions the affected UPS unit $USV_A$, $USV_B$, $USV_C$, $USV_X$ is isolated independently from the other UPS units $USV_A$, $USV_B$, $USV_C$, $USV_X$, without the electric consumers Vb-A.1 to Vb-A.3, Vb-B.1 to Vb-B.3, Vb-C.1 to Vb-C.3, Vb-X.1 to Vb-X.3, arranged downstream, being negatively affected.

UPS units $USV_A$, $USV_B$, $USV_C$, $USV_X$ are each decoupled by means of a first inductive impedance L1.1, i.e., an input choke, from the upstream supply network N.

Further, a second inductive impedance L1.2, i.e., an output choke L1.2, is provided for further decoupling of a subsequent consumer bus S2 from UPS units $USV_A$, $USV_B$, $USV_C$, $USV_X$.

For decoupling and coupling of the particular branch to UPS unit $USV_A$, $USV_B$, $USV_C$, $USV_X$, said branch is coupled by means of two power switches Q2, Q3 to the associated consumer network A, B, C, X. To bypass the branch with UPS unit $USV_A$, $USV_B$, $USV_C$, $USV_X$, another branch, which also has two power switches Q4, Q5 for coupling and decoupling, is connected parallel to it.

Figure 2A:
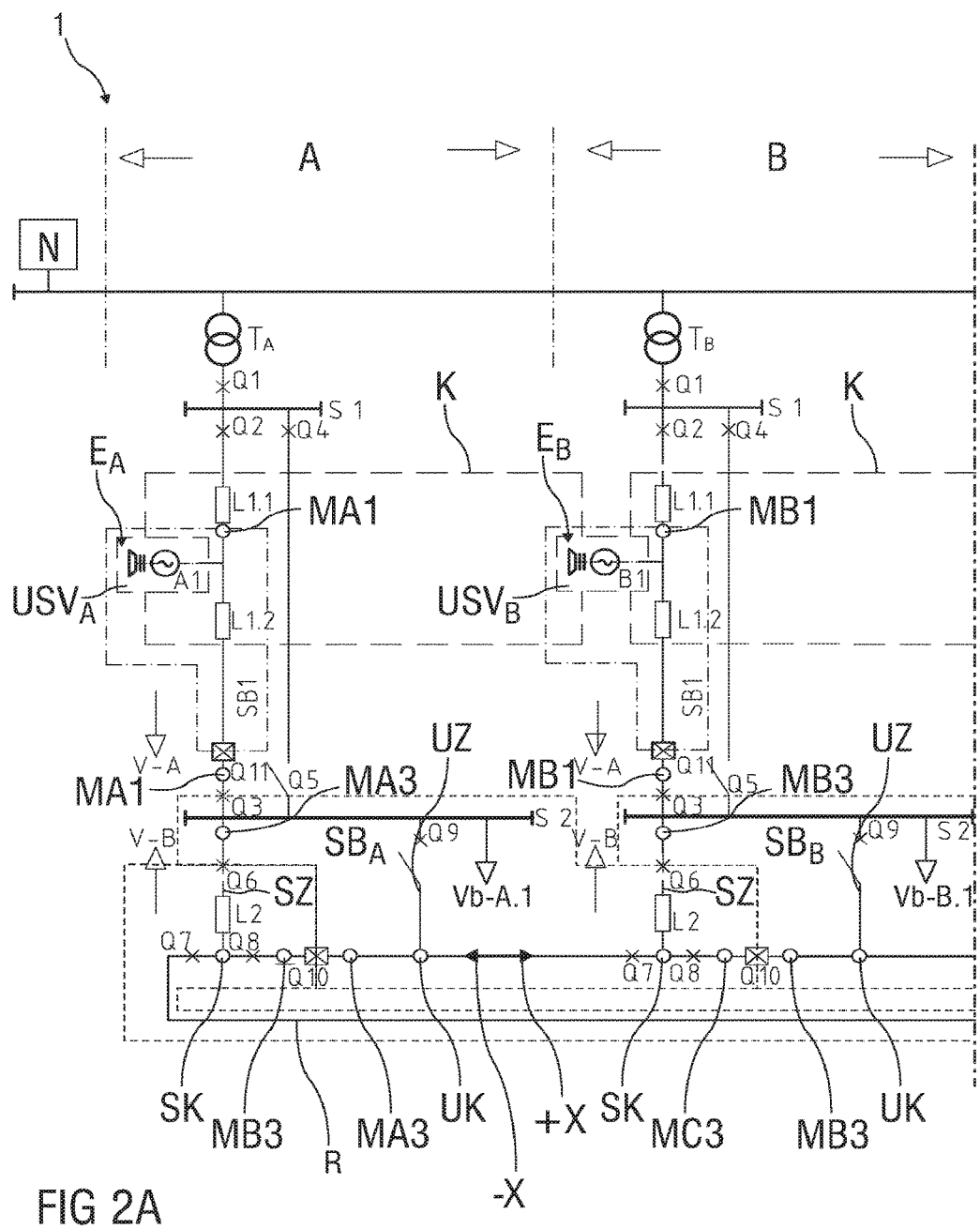
FIGS. 2A and 2B schematically show an additional electrical circuit diagram of the device of the invention according to FIGS. 1A and 1B.
Figure 2B:
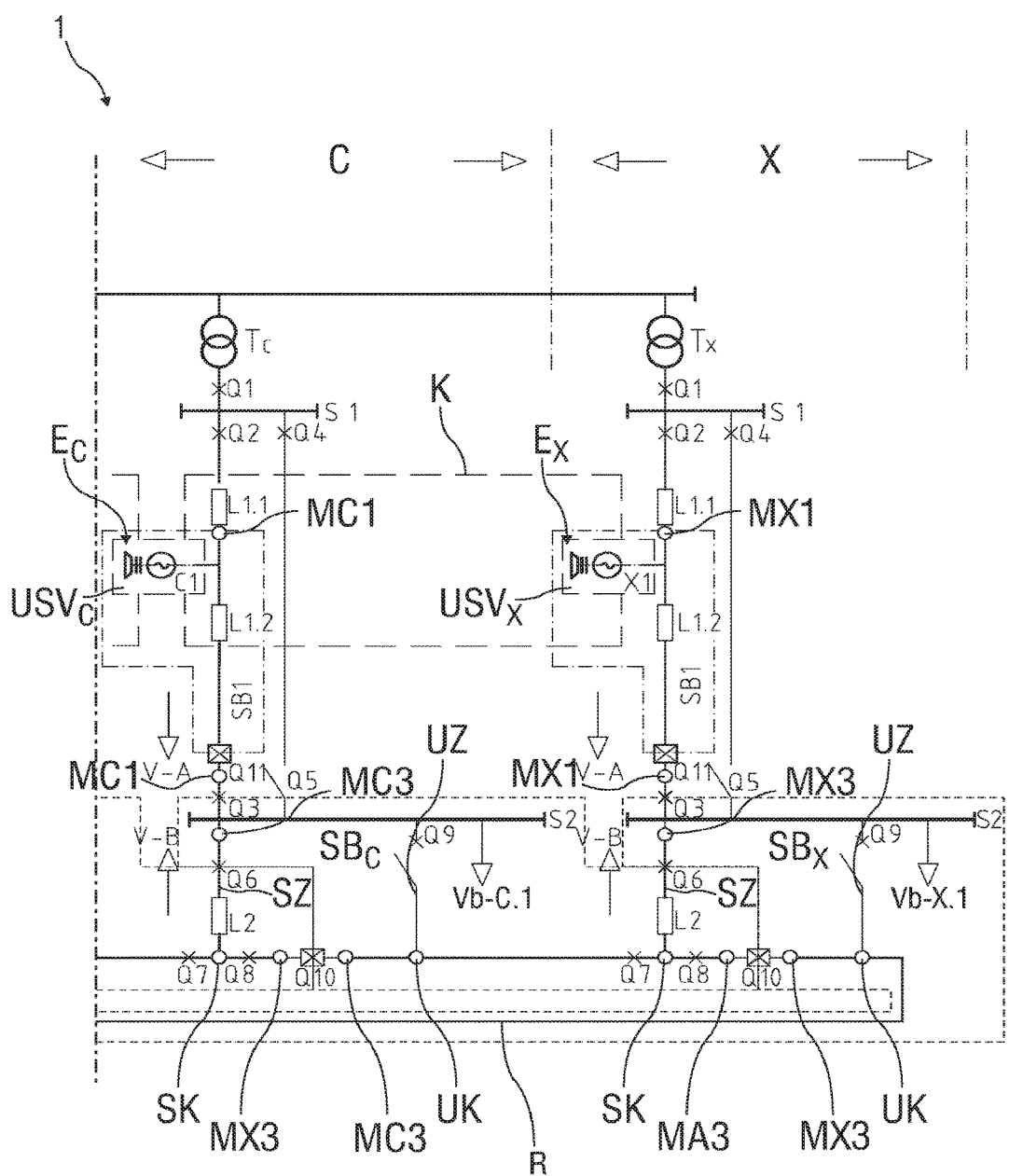

Consumer buses S2, as illustrated in greater detail in FIGS. 2A and 2B, are each coupled to multiple electric consumers Vb-A.1 to Vb-A.3, Vb-B.1 to Vb-B.3, Vb-C.1 to Vb-C.3, Vb-X.1 to Vb-X.3. In this regard, in the exemplary embodiment of device 1 illustrated in FIGS. 2A and 2B, two independent feeds are provided for each consumer Vb-A.1 to Vb-A.3, Vb-B.1 to Vb-B.3, Vb-C.1 to Vb-C.3, Vb-X.1 to Vb-X.3.

Consumer buses S2 in this regard are each connected to a mutual electrical ring connection R via a short-circuit current limiting coil L2 located in a coil branch SZ and electrically parallel to one another. The supply V-B of the redundant supply to consumer bus S2 occurs via this coil branch SZ. A further supply V-A, which is the main supply to consumer bus S2, occurs via the respective UPS unit $USV_A$, $USV_B$, $USV_C$, $USV_X$ in the consumer network A, B, C, X.

In coil branch SZ of the short-circuit current limiting coil L2, a first power switch Q6 is arranged upstream of it. Downstream of the short-circuit current limiting coil L2, coil branch SZ is electrically coupled to ring connection R via a coil connection node SK.

For this coupling, proceeding from coil connection node SK a second power switch Q7 is provided in a first ring direction −X and a third power switch Q8 in a second ring direction +X.

Electrically parallel to the short-circuit current limiting coils L2 in each case a bypass branch UZ is coupled to consumer bus S2 with a fourth power switch Q9 for bypassing the respective short-circuit current limiting coil L2 and to the mutual electrical ring connection R via a bypass node UK.

Further, a switching element Q10 with a switching time of less than 10 ms is arranged in ring connection R in each case between bypass node UK and third power switch Q8 for the electrical decoupling of the consumer networks A, B, C, X from one another.

First switching element Q10 is in particular a switching device with two parallel current paths. A main current path is provided for the operating current of, for example, up to 5000 A. A tripping, or disconnection, of the main current path of the first switching device Q10, is activated in event of an electrical fault by means of analog differential current monitoring. A fuse element (not shown) connected parallel to the main current path then limits the short circuit current during the first half cycle in less than 1 ms. The total switching time including the fault detection is less than 10 ms.

In event of a fault current of about 600%, based on the nominal current of the particular consumer network A, B, C, X, in the fourth protection zones $SB_A$, $SB_B$, $SB_C$, $SB_X$ the two first switching devices Q10, and the first power switch Q6 contained in this fourth protection zone $SB_A$, $SB_B$, $SB_C$, $SB_X$, affected by the fault, will be operated by a zone specific protection system so that this zone is decoupled from the parallel-connected consumer networks A, B, C, X, not affected by the fault.

Thus, the associated electric consumers Vb-A.1 to Vb-A.3, Vb-B.1 to Vb-B.3, Vb-C.1 to Vb-C.3, Vb-X.1 to Vb-X.3 for the associated consumer network A, B, C, X are supplied without interruption by the downstream consumer buses S2. A second supply branch for consumers Vb-A.1 to Vb-A.3, Vb-B.1 to Vb-B.3, Vb-C.1 to Vb-C.3, Vb-X.1 to Vb-X.3 is taken over by the adjacent consumer networks A, B, C, X.

When a UPS unit $USV_A$, $USV_B$, $USV_C$, $USV_X$ fails, the consumer bus S2 is supplied via short-circuit current limiting coils L2 from the adjacent consumer networks A, B, C, X. During this time, in consumer bus S2 a voltage drop results which is dependent on the power factor "cos φ" of the particular consumer Vb-A.1 to Vb-A.3, Vb-B.1 to Vb-B.3, Vb-C.1 to Vb-C.3, Vb-X.1 to Vb-X.3.

With the criterion that there is no fault in the affected consumer bus S2, when a UPS unit $USV_A$, $USV_B$, $USV_C$, $USV_X$ fails, the fourth power switch Q9 is promptly closed. Closing the fourth power switch Q9 bypasses the short-circuit current limiting coil L2. Until the bypass is closed, avoltage drop occurs in consumer bus S as a function of consumer power factor cos φ. After the fourth power switch Q9 is closed, this voltage drop declines with the number of consumer networks A, B, C, X, present in device 1.

The switching and controls in this regard occur separately and segment-based for each consumer network A, B, C, X without interdependencies or common influence.

In the operating situation with failure of a UPS unit $USV_A$, $USV_B$, $USV_C$, $USV_X$, as previously described, the consumer voltage continues to be supplied without interruption via the short-circuit current limiting coil L2 and then via power switch Q9. Thus, in maintenance situations as well for the UPS units $USV_A$, $USV_B$, $USV_C$, $USV_X$ and in upstream supply network N it is assured that the redundant supply V-A, V-B, i.e., the so-called A and B supply to electric consumers Vb-A.1 to Vb-A.3, Vb-B.1 to Vb-B.3, Vb-C.1 to Vb-C.3, Vb-X.1 to Vb-X.3, is permanently available.

The electric consumers Vb-A.1 to Vb-A.3, Vb-B.1 to Vb-B.3, Vb-C.1 to Vb-C.3, Vb-X.1 to Vb-X.3 are so-called high-availability consumers for which a power supply is always assured without interruption. Device 1 of the invention enables in an especially advantageous manner that the uninterruptible power supply can always be made available in a redundant configuration.

This is achieved by using a number of disconnection types and by protection zones SB1 to SB3 and the fourth protection zones $SB_A$, $SB_B$, $SB_C$, $SB_X$ with different switching times in each consumer network A, B, C, X.

To this end, each consumer network A, B, C, X has a first protection zone SB1. Within this protection zone SB1, in the case of an electric fault the particular UPS unit $USV_A$, $USV_B$, $USV_C$, $USV_X$ is disconnected from the associated consumer bus S2 in less than 10 ms by means of a second switching element Q11. The second switching element Q11 in this regard is preferably configured in accordance with the first switching element Q10.

Furthermore, each consumer network A, B, C, X has a fourth protection zone $SB_A$, $SB_B$, $SB_C$, $SB_X$ with instantaneous tripping. Each fourth protection zone $SB_A$, $SB_B$, $SB_C$, $SB_X$ contains the bypass branch UZ of a consumer bus S2 and the coil branch SZ with the first power switch Q6 of an adjacent consumer bus S2 arranged in the second ring direction +X and is limited at the edges in ring connection R by a first switching element Q10.

Further, two other protection zones SB2, SB3 are provided. A second protection zone SB2 is formed by a first line differential protection zone. This is formed between first power switch Q6, second power switch Q7, and third power switch Q8 of a consumer bus S2. If an electrical fault with a fault current of about 200%, based on the nominal current in the particular consumer network A, B, C, X, occurs within the first line differential protection zone, thus power switches Q6, Q7, Q8 of the fault-affected second protection zone SB2 are opened and therefore the electrical fault is isolated. Because power switches Q6, Q7, Q8 preferably have a switching time of less than 40 ms, the electrical fault is isolated within a maximum of 40 ms.

Further, each consumer network A, B, C, X has a third protection zone SB3, which is formed by a second line differential protection zone. This is formed between fourth power switch Q9, third power switch Q8, and second power switch Q7 of the adjacent consumer bus S2 arranged in the second ring direction +X. If an electric fault with a fault current of about 200%, based on the nominal current in the particular consumer network A, B, C, X, occurs within the second line differential protection zone, power switches Q8, Q9 and power switch Q7 of the adjacently arranged consumer bus S2 are opened and therefore the electrical fault is isolated, preferably also within a maximum of 40 ms.

Figure 1B:
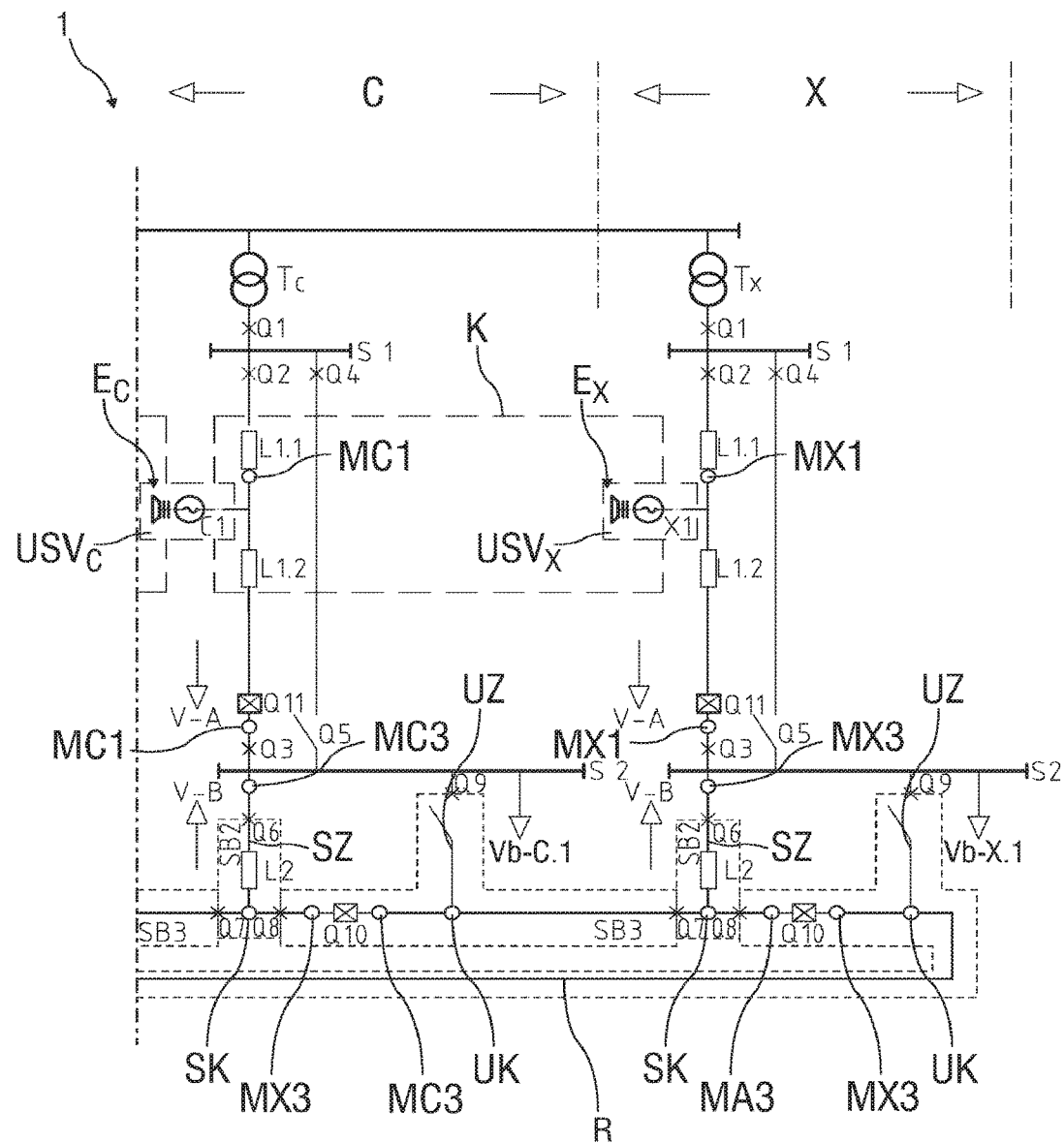

Protection zones SB2 and SB3 with a switching time of less than 40 ms are illustrated only in FIGS. 1A and 1B to preserve clarity. FIGS. 2A and 2B, in contrast, also to preserve clarity, show fourth protection zones $SB_A$, $SB_B$, $SB_C$, $SB_X$ with instantaneous tripping and protection zone SB1 with a switching time of less than 10 ms, but not protection zones SB2 and SB3. The described exemplary embodiment of device 1, however, include both protection zones SB1 to SB3 and fourth protection zones $SB_A$, $SB_B$, $SB_C$, $SB_X$ with instantaneous tripping.

Multiple measuring units (not shown) are provided to detect electrical faults, whereby current values are detected to detect faults in the first protection zone SB1 by means of the measuring units at measuring points MA1, MB1, MC1, MX1 and compared using a generally known method for realizing the line differential protection. The detection of faults, which lead to the triggering of the first protection devices Q10, which include one of the fourth protection zones $SB_A$, $SB_B$, $SB_C$, $SB_X$, occurs inter alia by means of measuring units at measuring points MA3, MB3, MC3, MX3 by means of detection of current values, which are compared by generally known methods for realizing the line differential protection.

The measuring points for the third protection zone SB3 are not shown here.

All electrical switching devices present in protection zones SB1 to SB3 and for protecting the fourth protection zones $SB_A$, $SB_B$, $SB_C$, $SB_X$ can be controlled independently of one another.

An additional protection concept is provided in order to keep the supply voltage in consumer buses S2 within a tolerance acceptable to consumers Vb-A.1 to Vb-A.3, Vb-B.1 to Vb-B.3, Vb-C.1 to Vb-C.3, Vb-X.1 to Vb-X.3 when a short circuit with very high short-circuit currents occurs in a consumer network A, B, C, X. This is realized with the first switching devices Q10.

When such faults occur, the complete decoupling of the particular fourth protection zone $SB_A$, $SB_B$, $SB_C$, $SB_X$ from the parallel-connected consumer networks A, B, C, X occurs within a maximum of 10 ms by means of two first switching devices Q10 and the first power switch Q6. It is assured thereby that the fourth protection zone $SB_A$, $SB_B$, $SB_C$, $SB_X$ affected by the fault is completely isolated within less than 10 ms including the fault detection time.

Each of the fourth protection zones with instantaneous tripping $SB_A$, $SB_B$, $SB_C$, $SB_X$ is included in each of the ring directions (−X, +X) by the switching elements Q10 with additional control of the first power switch Q6 in a closed connection in the fourth protection zone $SB_A$, $SB_B$, $SB_C$, $SB_X$ affected by the fault. Two first switching elements Q10 and the affected first power switch Q6 are controlled by monitoring control of the particular consumer network A, B, C, X or fourth protection zone $SB_A$, $SB_B$, $SB_C$, $SB_X$.

Power switches Q6 to Q9 and first switching devices Q10 and second switching devices Q11 can be controlled independently of one another.

It is assured thereby that in the case of an electrical fault, particularly an electrical short circuit, the consumer voltage remains within an acceptable range at each point in time. In addition, in the case of a short circuit or fault in ring connection R between consumer networks A, B, C, X the redundant electrical supply to consumers Vb-A.1 to Vb-A.3, Vb-B.1 to Vb-B.3, Vb-C.1 to Vb-C.3, Vb-X.1 to Vb-X.3 continues to be maintained.

Consequently, it is possible, as in the UPS units $USV_A$, $USV_B$, $USV_C$, $USV_X$, that in the case of electrical faults the affected consumer network A, B, C, X isolates itself independently from the other consumer networks A, B, C, X, without the downstream electric consumers Yb-A.1 to Vb-A.3, Vb-B.1 to Vb-B.3, Vb-C.1 to Vb-C.3, Vb-X.1 to Vb-X.3 being negatively affected.

If a failure in the communication of a consumer network A, B, C, X occurs, the associated UPS unit $USV_A$, $USV_B$, $US_C$, $USV_X$ is isolated from the parallel-connected connection by opening of first power switch Q6 and blocking of fourth power switch Q9. As a result, normal function of the remaining consumer buses S2 in the parallel connection is assured and UPS unit $USV_A$, $USV_B$, $USV_C$, $USV_X$ with the disturbance supplies the associated consumer bus S2 in island operation. Because of the novel structure of device 1, the consumer voltage in consumer buses S2 in this operating situation as well is also within the range tolerable for electric consumers Vb-A.1 to Vb-A.3, Vb-B.1 to Vb-B.3, Vb-C.1 to Vb-C.3, Vb-X.1 to Vb-X.3.

Characteristic values are presented below of an exemplary configuration of device 1, whereby each consumer bus S2 is loaded with a power of 1.2 MVA and overall four consumer networks A, B, C, X coupled parallel via a ring connection are provided.

The characteristic values of the equipment are as follows:
Transformers $T_A$, $T_B$, $T_C$, $T_X$: S=2.5 MVA, $U_K$: 6%,
UPS generator: S=2 MVA, x"_d=10.08%,
First inductive impedance L1.1: $U_K$=34.17%,
Second inductive impedance L1.2: $U_K$=0.95%,
Short-circuit current limiting coil L2: $U_K$=25%,
Total system power per consumer network A, B, C, X:
  S=2 MVA,
Consumer load S=1.2 MVA with a power factor cos
  φ=0.95,
where $U_K$=rated value of the short-circuit voltage of a transformer $T_A$, $T_B$, $T_C$, $T_X$ in %, x"_d=subtransient reactance of a synchronous machine in the longitudinal or transverse axis, and S=apparent complex power.

According to VDE 0102, in the case of a 3-pole short circuit in a consumer bus S2, voltage dips of less than 10% occur in the unaffected consumer buses S2. The fault turn-off time with customary low-voltage switches is less than 40 ms in this case.

In the case of faults in the electrical connection between consumer networks A, B, C, X in a 3-pole short-circuit, a voltage dip of about 32% for less than 10 ms results in consumer buses S2.

Figure 3:
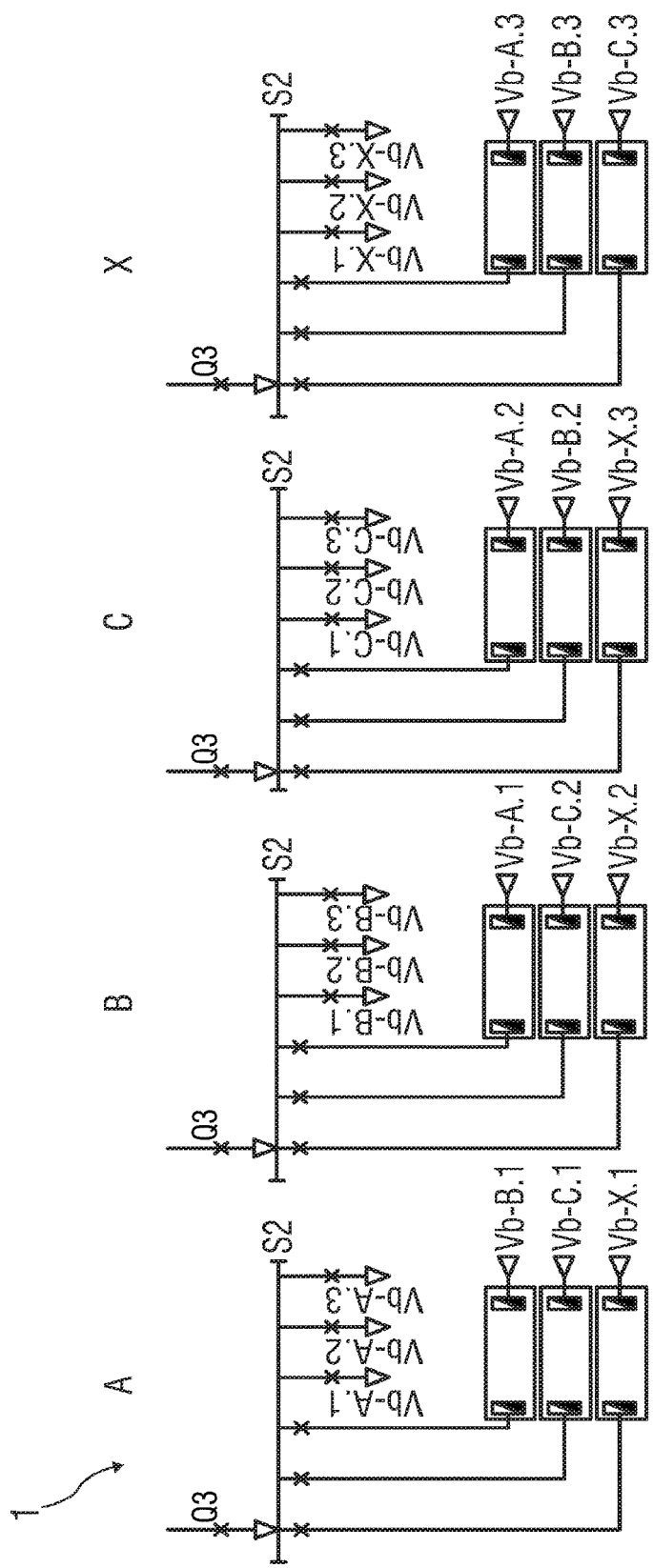
FIG. 3 schematically shows a detail of an electrical circuit diagram of an exemplary embodiment of the device with four consumer buses for connecting consumers with two independent electrical feeds.
Figure 4A:
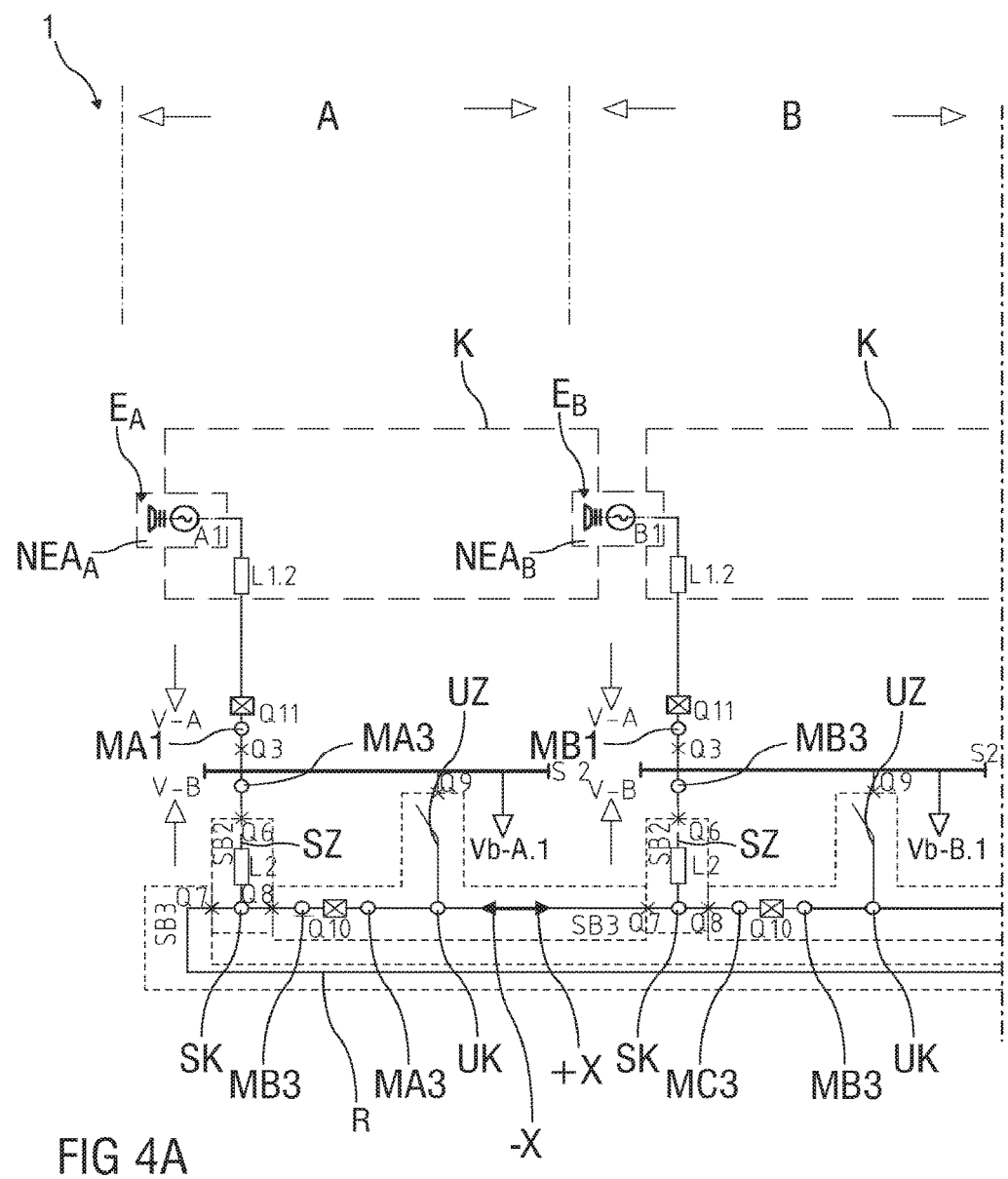
FIGS. 4A and 4B schematically show an electrical circuit diagram of an exemplary embodiment of the device of the invention with four electric consumer buses and four distributed power generation units without a coupled electrical supply network.
Figure 4B:
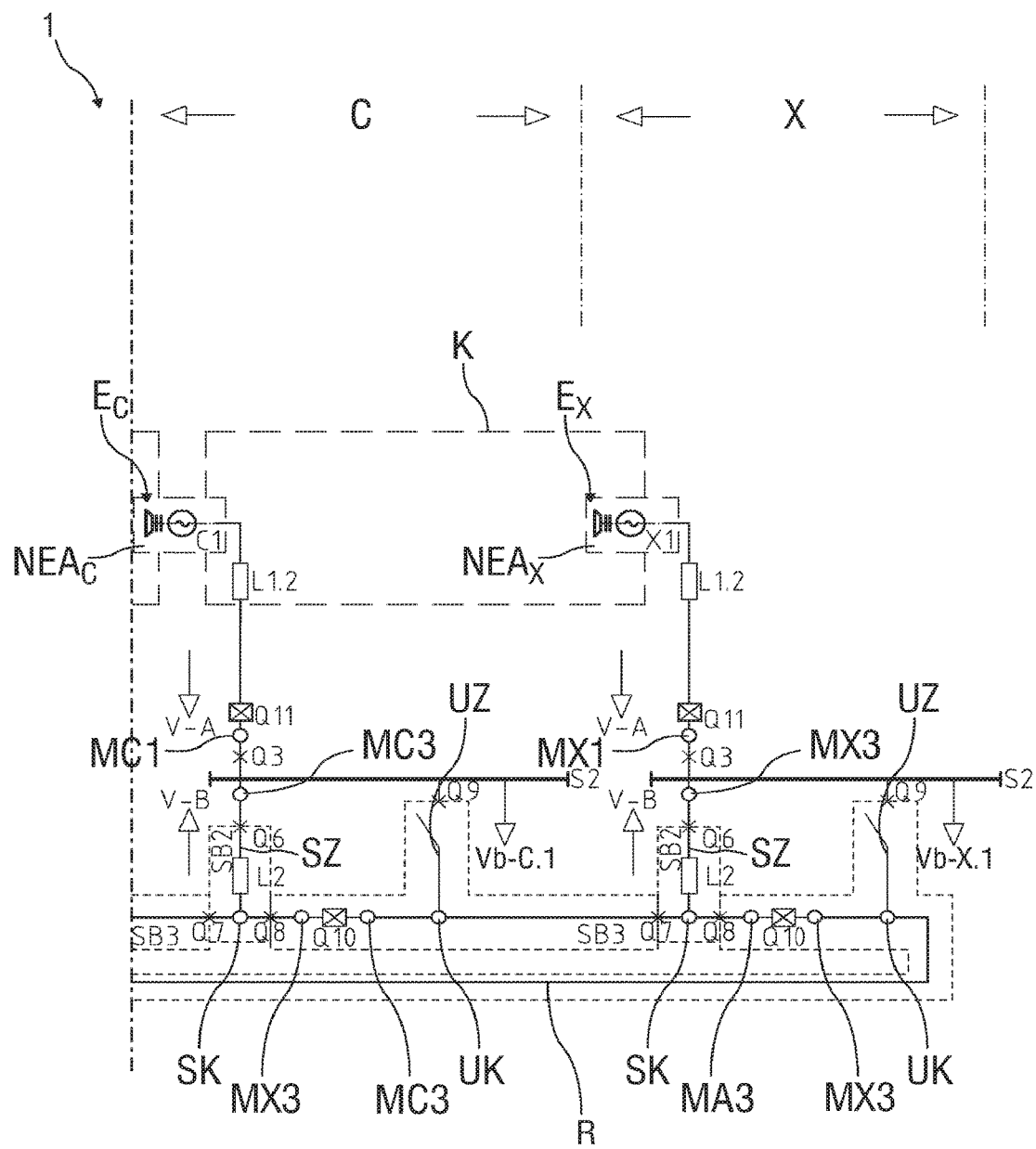
Figure 5A:
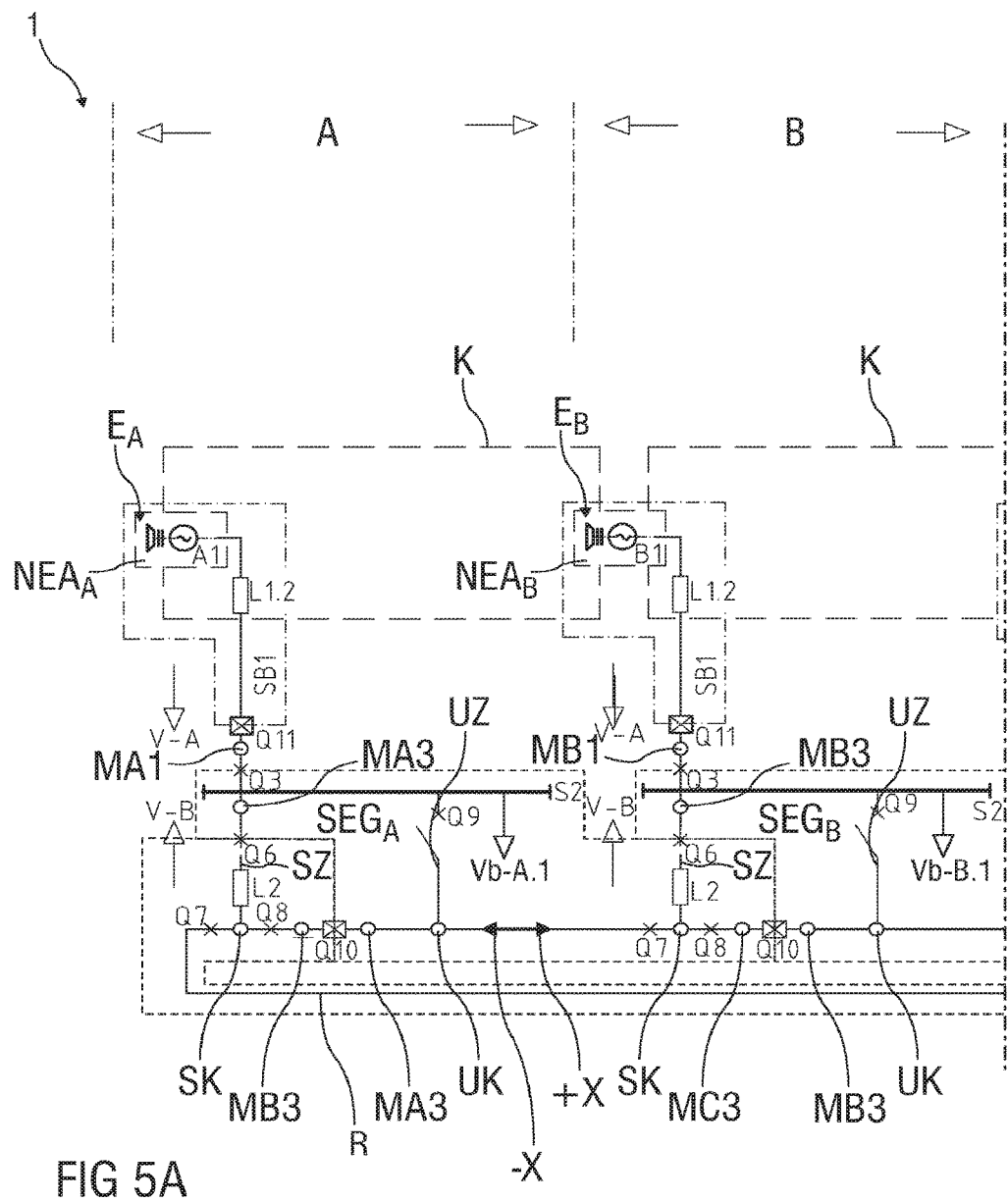
FIGS. 5A and 5B schematically show an electrical circuit diagram of an embodiment of the device of the invention according to FIGS. 4A and 4B.
Figure 5B:
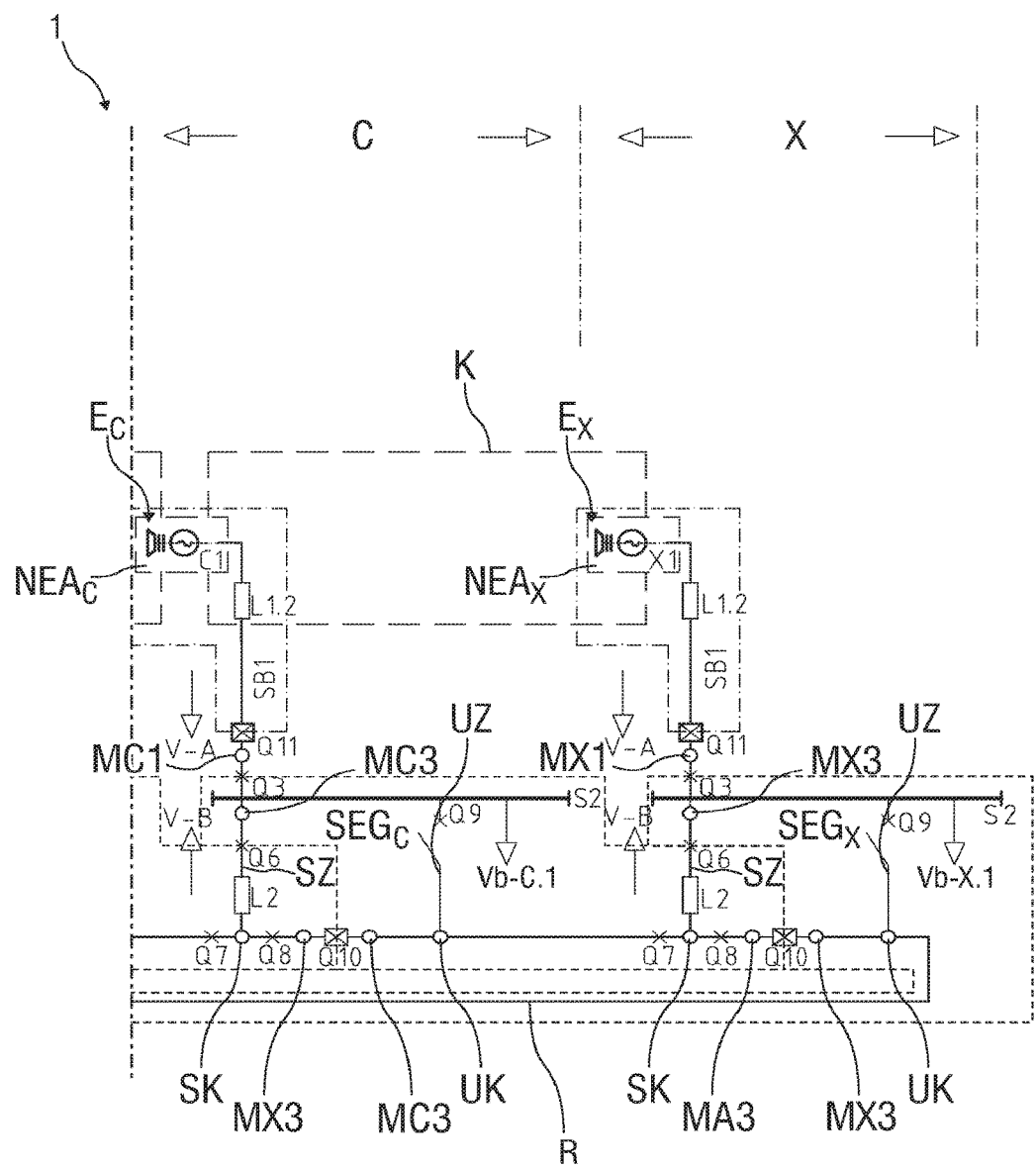

FIG. 3 shows a detail of a second exemplary embodiment of device 1, whereby electric consumers Vb-A.1 to Vb-A.3, Vb-B.1 to Vb-B.3, Vb-C.1 to Vb-C.3, Vb-X.1 to Vb-X.3 are supplied electrically with two independent feeds.

In this regard, sections of the four electric consumer networks A, B, C, X are shown in the area of the four consumer buses S2. Each consumer bus S2 is designed to electrically supply three electric consumers Vb-A.1 to Vb-A.3, Vb-B.1 to Vb-B.3, Vb-C.1 to Vb-C.3, Vb-X.1 to Vb-X.3.

Further, for the redundant supply to electric consumers Vb-A.1 to Vb-A.3, Vb-B.1 to Vb-B.3, Vb-C.1 to Vb-C.3, Vb-X.1 to Vb-X.3, in addition an electric consumer Vb-A.1 to Yb-A.3, Vb-B.1 to Vb-B.3, Vb-C.1 to Vb-C.3, Vb-X.1 to Vb-X.3 of each parallel-connected consumer network A, B, C, X can be supplied with electrical power from the "adjacent" consumer networks A, B, C, X.

In FIGS. 4A and 4B and 5A and 5B, a third exemplary embodiment of device 1 is illustrated, whereby the distributed power generation units $E_A$, $E_B$, $E_C$, $E_X$ are designed as an $NEA_A$, $NEA_B$, $NEA_C$, $NEA_X$ unit for uninterruptible power supply without a network feed. The further structure, the division into protection zones with instantaneous tripping $SB_A$, $SB_B$, $SB_C$, SB, and the division into protection zones SB1 to SB3 correspond to the first exemplary embodiment illustrated in FIGS. 1A and 1B and 2A and 2B.

Figure 6:
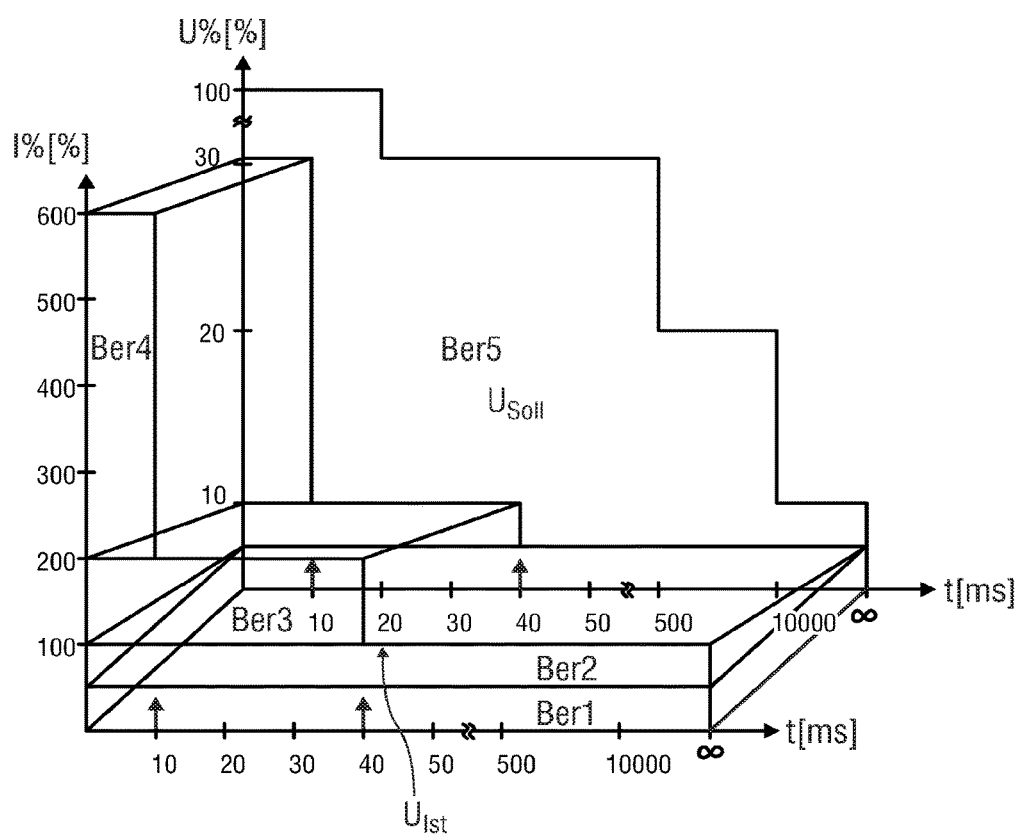
FIG. 6 schematically shows a comparison of a current profile in an electrical ring connection of the device and a voltage drop in the consumer buses of the device according to the invention with values according to the conventional art.

FIG. 6 shows a comparison between an acceptable target consumer voltage $U_{target}$ according to the conventional art and the actual consumer voltage $U_{act}$ arising in a disturbance or electrical fault in device 1.

The target consumer voltage $U_{target}$ and the actual consumer voltage $U_{act}$ are shown here as voltage drop U % in consumer buses S2 as a function of time t.

Further, the electrical current I % is shown in % in ring connection R between consumer networks A, B, C, X based on a nominal current of the particular consumer network A, B, C, X as a function of time t.

A first zone Zone1 shows a normal operation of ring connection R with a division of the nominal current in 2 times 50%. The voltage drop U % in this case in consumer bus S2 without a generator is 6%.

A second zone Zone2 shows an operation of ring connection R as an open ring with a nominal current of 100%. Here as well, the voltage drop U % in consumer bus S2 without a generator is 6%.

A third zone Zone3 shows an operation of ring connection R as a closed ring with a fault current of 200%, based on the nominal current. In this case, the voltage drop U % in consumer bus S2 is 10% for a maximum of 40 ms, because the electrical fault after a maximum of 40 ms is isolated by means of second protection zone SB2 or third protection zone SB3 depending on the fault location and operating situation.

A fourth zone Zone4 shows an operation of ring connection R as a closed ring with a fault current of 600%, based on the nominal current. In this regard, the voltage drop U % in consumer bus S2 is about 30% for a maximum of 10 ms, because the affected consumer network A, B, C, X after a maximum of 10 ms is isolated by switching devices Q10 by means of first switching units Q10.

A fifth zone Zone5 in contrast shows the voltage drop U %, acceptable according to the conventional art, in consumer bus S2.

It is evident from the illustration in FIG. 6 that a significant margin below the acceptable voltage drop U % can be achieved in consumer bus S2 by means of device 1 of the invention, the method for the operation thereof, and the particular exemplary embodiments in an especially advantageous manner compared with the conventional art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for an uninterruptible power supply to electric consumers, the system comprising:
    a ring connection having a plurality a protection zones around the ring connection, each of the protection zones comprising a current limiting coil, a bypass branch, and a switching element, wherein, for each protection zone, the current limiting coil is electrically coupled to the bypass branch by the switching element in a common direction around the ring;
    a plurality of consumer busses, wherein each of the consumer busses is connected in parallel to a different one of the protection zones of the ring connection by the current limiting coil and the bypass branch of the respective protection zone; and
    a plurality of electrical distributed power generation units coupled to respective ones of the consumer busses and configured to deliver power to the consumer devices coupled to the respective consumer bus.

2. The system of claim 1, wherein each of the bypass branches is coupled to the bypass branch of a neighbor protection zone in the common direction around the ring connection through one of the switching elements that defines the neighboring protection zone.

3. The system of claim 2, wherein for each protection zone the respective bypass branch is coupled to the current limiting coil of a neighbor protection zone in the common direction around the ring connection without one of the switching elements positioned therebetween.

4. The system of claim 1, wherein in response to a fault in a first electrical power generation unit:
    the respective switching element coupled to the respective current limiting coil of the first electrical power generation unit is configured to open to isolate the first electrical power generation unit from a second electrical power generation unit in a neighbor protection zone in the common direction around the ring connection, and
    the respective bypass branch coupled to the respective switching element is configured to couple deliver power to the respective consumer devices of the first electrical power generation with the second electrical power generation unit in the neighbor protection zone in the common direction around the ring connection.

5. The system of claim 4, wherein the fault in the first electrical power generation occurs when one of:
    a voltage drop in the respective consumer bus coupled to the first electrical power generation unit is greater than a voltage threshold, or
    a current from the first electrical power generation unit into the ring connection is greater than a current threshold.

6. The system of claim 5, wherein the voltage threshold comprises 30% greater than a nominal voltage drop based on load requirements, and wherein the current threshold comprises 600% of a nominal current level.

7. The system of claim 1, wherein the switching element in each of the protection zones is configured to switch to decouple respective consumer busses from the ring connection in less than 10 ms.

8. The system of claim 1, wherein respective switching element and bypass branch in respective protection zones are independently controllable.

* * * * *